United States Patent [19]

Loftis et al.

[11] Patent Number: 5,185,693

[45] Date of Patent: Feb. 9, 1993

[54] METHOD AND APPARATUS FOR PROVIDING BACKUP PROCESS CONTROL

[75] Inventors: Donald B. Loftis; David W. Cawlfield, both of Cleveland, Tenn.

[73] Assignee: Olin Corporation, Cheshire, Conn.

[21] Appl. No.: 827,920

[22] Filed: Jan. 29, 1992

Related U.S. Application Data

[63] Continuation of Ser. No. 441,147, Nov. 27, 1989, abandoned.

[51] Int. Cl.$^5$ .................. G06F 11/20; G06F 15/46
[52] U.S. Cl. ................. 364/187; 364/551.01; 364/131; 371/9.1; 395/575; 375/9.1
[58] Field of Search .......... 364/187, 131, 550, 551.01; 371/9.1, 16.3, 68.3; 375/22, 95; 395/575

[56] References Cited

U.S. PATENT DOCUMENTS

| | | | |
|---|---|---|---|
| 3,636,331 | 1/1972 | Amrehn | 371/9.1 |
| 4,276,593 | 6/1981 | Hansen | 364/187 |
| 4,351,023 | 9/1982 | Richer | 371/9.1 |
| 4,562,528 | 12/1985 | Baba | 364/187 |
| 4,610,013 | 9/1986 | Long et al. | 371/9.1 |
| 4,684,885 | 8/1987 | Chapman | 371/9.1 |
| 4,691,315 | 9/1987 | Murphy | 371/9 |
| 4,775,976 | 10/1988 | Yokoyama | 371/9.1 |
| 4,797,884 | 1/1989 | Yalowitz et al. | 371/9.1 |
| 4,819,232 | 4/1989 | Krings | 371/9.1 |
| 4,836,903 | 6/1989 | Cawlfield | 204/228 |
| 4,857,158 | 8/1989 | Cawlfield | 204/92 |
| 4,858,233 | 8/1989 | Dyson et al. | 371/9.1 |
| 4,862,452 | 9/1989 | Milton et al. | 370/62 |
| 4,872,106 | 10/1989 | Slater | 364/200 |
| 4,943,926 | 7/1990 | Guzman-Edery et al. | 364/486 |

FOREIGN PATENT DOCUMENTS

| | | | |
|---|---|---|---|
| 57-111752 | 7/1982 | Japan . | |
| 55-185401 | 7/1982 | Japan | 371/9.1 |
| 59-33501 | 2/1984 | Japan . | |
| 57-144202 | 2/1984 | Japan | 364/187 |
| 63-128839 | 6/1988 | Japan . | |
| 61-275713 | 6/1988 | Japan | 371/9.1 |

Primary Examiner—Vincent N. Trans
Attorney, Agent, or Firm—H. Samuel Kieser; Ralph D'Alessandro

[57] ABSTRACT

In a backup mode of operation a process control program sends messages, via a local area network, to a process control program running in an active mode for the purpose of obtaining current values of process control data and configuration information. If the active process control program fails to respond to an interrogation by the backup process control program the backup program automatically activates itself to assume the active role. The activation procedure includes a sequence that transmits a control pulse of predetermined width on a line of an associated process control bus to a novel digital data switch. The receipt of a valid control pulse causes the digital data switch to allow access by the backup (now active) data processor to process control I/O unit(s) while simultaneously isolating the active (now backup) data processor from the I/O units. If a response is received the backup processor receives and stores within a memory current process related data such that in the event the backup processor is required to assume the active processor functions the backup processor is fully cognizant of the current state of the process control environment. The switch may also include a watch dog timer for monitoring activity of at least one bus signal line associated with the active data processor for indicating an occurrence of a failure of the active data processor.

19 Claims, 6 Drawing Sheets

METHOD AND APPARATUS FOR PROVIDING BACKUP PROCESS CONTROL

This application is a continuation of application Ser. No. 07/441,147 filed Nov. 27, 1989, now abandoned.

FIELD OF THE INVENTION

This invention relates generally to process control and, in particular, to a process control system employing redundant data processors for providing reliable backup capability, the system further including a communication network interconnecting the two data processors and novel switching circuitry for coupling the data processors to remote process control circuitry.

BACKGROUND OF THE INVENTION

Many process control applications are implemented with low cost small computer hardware equipped with input/output (I/O) boards coupled to process equipment to be controlled and/or monitored. As such, a requirement for reliable process control back-up systems is becoming increasingly important to counter the adverse effect of computer software and hardware failure upon the process control application. One method of providing back-up is through the use of redundant computer hardware.

However, a problem is presented when it is required to switch between an active computer and a back-up computer as the back-up computer may not be entirely cognizant of the current state of the process control environment. In order to provide for a transparent "bumpless" switch-over between active and back-up computers the back-up computer must be continually apprised of the current state of the process control environment including changes in process setpoints, changes in on-line and off-line processing instrumentation, etc. Furthermore, for the switch-over to occur automatically the back-up computer must be capable of readily detecting a fault in the operation of the active computer and must also include suitable means for initiating and accomplishing the switch-over without disrupting the process control environment. Prior to the invention disclosed herein no known process control system implemented with relatively small, low cost and redundant computer hardware overcame in a satisfactory manner the foregoing and other problems.

It is therefore an object of the invention to provide relatively low cost computer hardware, such as well-known personal-type computers, for use in reliably controlling processes.

It is a further object of the invention to provide for ongoing processes to continue without interruption while a failed process control computer is taken off-line.

It is a still further object of the invention to provide novel bus switch apparatus for bidirectionally coupling a primary and a back-up computer to process control instrumentation.

It is one more object of the invention to provide for a transparent and rapid switch-over of control between an active process control computer and a back-up computer, a current state of the process control environment being regularly updated in the backup computer by the active computer via a local area network.

SUMMARY OF THE INVENTION

The foregoing and other problems are overcome and the objects of the invention are realized by, in accordance with the invention, an electronic switch that provides redundant computer control of a parallel bidirectional bus interfaced to a resource, such as process control I/O units. The electronic switch is electrically coupled to a parallel process interface bus connected between two redundant process control computers and process control I/O data acquisition/control units. The redundant computers, an active computer and a back-up computer, share information regarding the process or processes being monitored and controlled via a communications bus, such as local area network. If a control fault is detected by software in the back-up computer a switching control signal is generated upon the back-up computer's parallel process interface bus. The signal, preferably a pulse having a predetermined pulsewidth, is tested for validity by the electronic switch and, if valid, triggers the electronic switch to electrically isolate the faulty computer from the process control I/O data acquisition/control units and to electrically couple the back-up computer to the process control I/O data acquisition/control units.

In accordance with a method of the invention in a backup mode of operation a process control program sends messages, via a local area network, to a process control program running in an active mode for the purpose of obtaining the current values of process control data and configuration information. If the active process control program fails to respond to an interrogation by the backup process control program, the backup program automatically activates itself to assume the active role. The activation procedure includes a sequence that transmits a control pulse of predetermined width on a line of an associated process control bus to a novel digital data switch. The receipt of a valid control pulse causes the digital data switch to allow access by the backup (now active) data processor to process control I/O unit(s), while simultaneously isolating the active (now backup) data processor from the I/O units. If a response is received the backup processor receives and stores within a memory current process related data such that in the event the backup processor is required to assume the active processor functions, the backup processor is fully cognizant of the current state of the process control environment.

An additional embodiment of the invention includes a Watch Dog Timer that is employed to detect a loss of bus activity associated with the active data processor. If no bus activity is detected within a predetermined interval of time the Timer signals the backup data processor and the backup data processor initiates a transfer of control from the active data processor. For some applications transfer of control occurs at the occurrence of a condition wherein the Timer has signalled the backup data processor and the active data processor has not responded to a request for update from the backup data processor. For other applications the Timer can directly initiate the switchover between the active and the backup data processors.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

The following description of the invention is presented in the context of a presently preferred embodiment including a pair of data processors implemented with 80286 or 80386 hardware platforms each running a multi-tasking/multi-user operating system known in the art as "QNX". QNX is a product of Quantum Software of Kanata, Canada. QNX provides local area network (LAN) capability through a coaxial cable conductor. The LAN capability of QNX includes a name registry function as discussed below. The data processors execute process control application software based upon a package available commercially from the assignee of this patent application and known in the art as "OMNX". Suitable process control I/O data acquisition/control units are a type available from OPTO 22 of Huntington Beach, Calif. It should be realized, however, that the invention may be practiced with a number of different hardware and software embodiments, including but not limited to personal computers, minicomputers or mainframe computers running single or multi-tasking, single or multi-user operating systems. Furthermore process control application software other than OMNX can be used as can a variety of types of I/O units. As such, the practice of the invention is not to be construed to be limited for use only with the hardware and software embodiments described herein.

Figure 1:
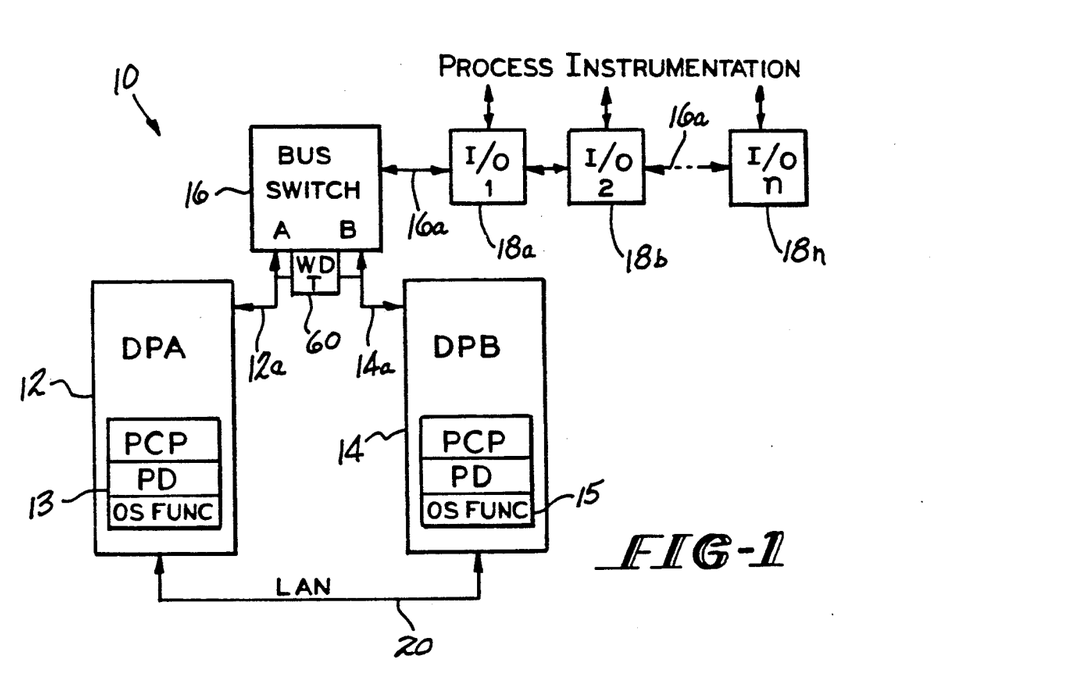
FIG. 1 is a simplified block diagram of a process control system constructed and operated in accordance with the invention.

FIG. 1 illustrates a process control system 10. System 10 includes a first data processor (DPA) 12 and a second data processor (DPB) 14 electrically coupled to an electronic bus switch 16 by means of an associated parallel bus 12a and 14a, respectively. Parallel buses 12a and 14a are preferably each a 50 pin parallel bus including address and data lines, various strobes and a control pulse line as will be described. Switch 16 routes either the bus 12a or the bus 14a to a plurality of remotely located (field) process control I/O data acquisition/control units designated as I/O 18a, I/O 18b and I/O 18n. The I/O units 18 are further coupled to process instrumentation for monitoring and/or controlling an ongoing process such as a manufacturing process. By example, one of the I/O units 18 may be an analog-to-digital (A/D) conversion board having an analog input coupled to an output of a thermocouple and a digital output coupled to the bus 16a for providing digital information thereto, the digital information being expressive of a temperature sensed by the thermocouple. Other I/O units 18 may have outputs coupled to motors, heaters or other devices, these other I/O units having digital inputs coupled to the bus 16a for receiving digital information therefrom. In either case the digital information passing through the switch 16 is transmitted from or received by either the DPA 12 or the DPB 14, depending upon which one of the two data processors is currently functioning as the active, controlling data processor. During normal operation either DPA 12 or DPB 14 is in an active mode of operation while the other data processor is in a back-up mode of operation. If DPA 12 is active and DPB 14 is in backup mode, then the signals follow a path from DPA 12 through the A port of switch 16 to the I/O units 18. If DPB 14 is active and DPA 12 is in backup mode, then the signals follow a path from DPB 14 through the B port of switch 16 to the I/O units 18.

Each of the data processors 12 and 14 includes a memory 13 and 15, respectively, wherein is stored a process control program (PCP) that is preferably OMNX or a variant thereof, process-related data (PD) and QNX operating system functions (OS FUNC) related to operation of the data processor and also to operation of an associated local area network (LAN) 20.

In accordance with one embodiment of the invention a fault in information or communication is detected by the backup computer, causing the backup computer to issue a command to the switch 16, the command preferably being in the form of a control pulse of predetermined width that is issued on one of the lines of the bus 12a or 14a. The switch 16 tests the control pulse to determine if the pulse is valid or is due instead to some extraneous cause such as noise. If the pulse is determined to be valid the switch 16 isolates the bus of the faulty data processor and activates the bus of the back-up data processor, thereby making the back-up data processor the active data processor and vice versa.

A fault in the operation of the active data processor may be determined by the backup data processor by a number of methods. A first method employs a communication link between DPA 12 and DPB 14. The communication link is embodied in the LAN 20 connected between the two data processors, the LAN 20 comprising a high data rate coaxial cable coupled at both ends to a respective driver/receiver circuit within the associated data processor. The LAN 20 could also be implemented, by example, by a relatively simple communication link such as an RS-232C or RS-422 type link managed by appropriate communication software.

The LAN 20 coupled between the redundant data processors serves two primary functions. Firstly, the active data processor uses the LAN 20 to constantly update the backup data processor with current information concerning process monitoring and control loops. This ensures that changes in setpoint, variable calculations, tuning parameters and other process control related data are transferred to the backup data processor thereby ensuring a smooth transfer of control between the active and backup data processors. Secondly, the LAN 20 provides one means for the backup data processor to determine the operational state of the actively controlling data processor. For example, if the active data processor does not respond within some predetermined interval of time to a request for information from the backup data processor, the backup data processor may assume that the active data processor has failed. The backup data processor may then initiate, in a manner to be described, a transfer of control switching sequence. The LAN 20 may be coupled to other nodes or devices in addition to the DPA 12 and DPB 14 and preferably does not rely upon any one node to act as a server.

Figure 2:
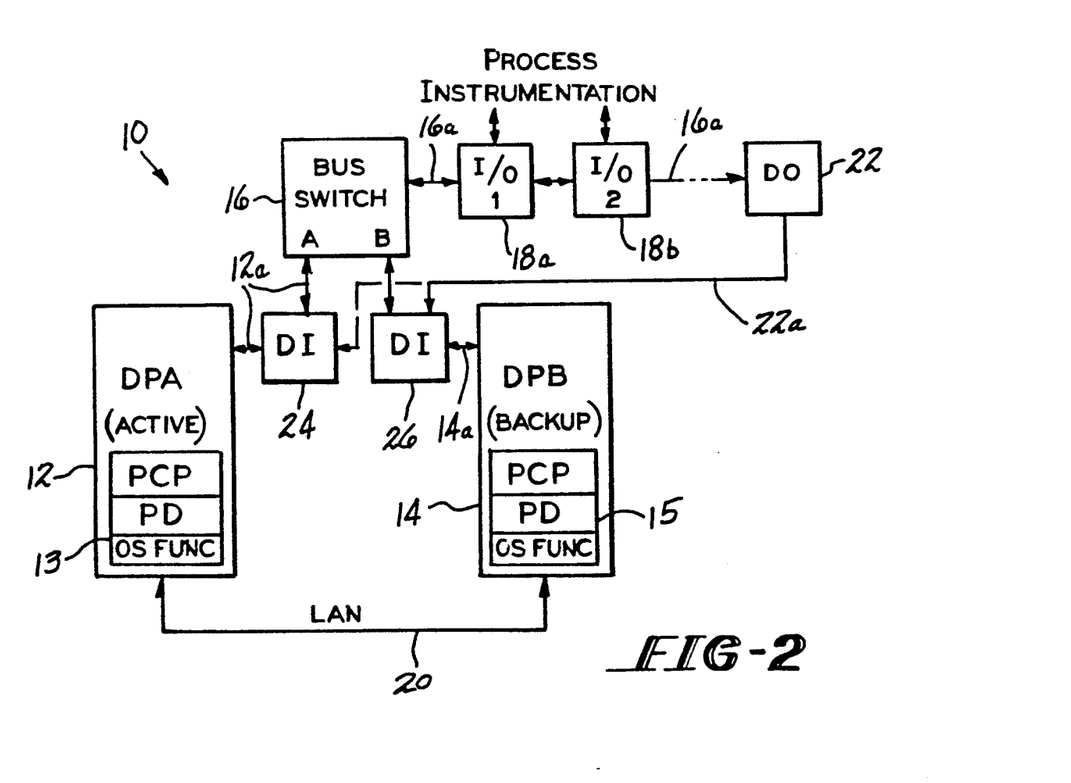
FIG. 2 is a simplified block diagram of another embodiment of a process control system constructed and operated in accordance with the invention.

FIG. 2 illustrates another embodiment of the process control system employing redundant data processors 12 and 14, the embodiment of FIG. 2 implementing a second method of determining if the active computer has failed. To insure the robustness of the system 10 this second method is preferably implemented in conjunction with the LAN 20 of the first method. In FIG. 2 DPA 12 is shown, by example, to be actively controlling the I/O bus 16a while DPB 14 is functioning as the backup data processor. The system 10 includes a digital output (DO) device 22 coupled to a terminal end of the I/O bus 16a. During operation DPA 12 periodically instructs DO device 22 to generate an output signal on line 22a. The output on line 2a is supplied to the input of a digital input (DI) device 24 associated with DPA 12 and a similar DI device 26 associated with DPB 14. The backup data processor, here DPB 14, tests the DI device 26 to determine if the digital signal from DO device 22 is present. If the signal is found not to be present the backup data processor may assume that for some reason the active data processor is not in communication with the I/O units 18, indicating a failure of at least the process control function of the active data processor. The line 22a may convey a single bit or may be more complex and convey a plurality of digital signal lines.

FIG. 1 further illustrates an additional embodiment of the invention wherein a Watch Dog Timer (WTD) 60 is employed to detect loss of bus activity on either of the buses 12a or 14a. If no bus activity is detected within a predetermined interval of time the WTD 60 signals the backup data processor via the associated bus 12a or 14a and the backup data processor initiates a transfer of control from the active data processor. For some applications it may be desirable to transfer control at the occurrence of a condition wherein the WTD 60 has signalled the backup data processor and the active data processor has not responded to a request for update from the backup data processor.

In accordance with an aspect of the invention the process control application software contained in both the active and the backup data processors is substantially identical. The data processor whose controlling program is started first assumes the role of the active data processor while the other data processor, detecting this condition, assumes the role of the backup data processor. By example, if control shifts from DPA 12 to DPB 14 the controlling software in DPA 12 is restarted and, since DPB 14 is already active, DPA 12 assumes the role of the backup data processor.

At the time the process control program is loaded and begins execution it initializes either a backup mode flag or an active mode flag by employing an operating system (OS) function to determine if another control program is already operating. One means for the active process control program to allow other programs to detect its existence is by registering, in a known manner, an associated name with the QNX LAN 20 operating system. Similarly, the backup process control program registers its name with the LAN 20 when it switches to active mode.

In the multi-tasking control network, OMNX-associated or other suitable display and data logging programs run independently of the control program but read process data from it. The LAN 20 name registry provides one, presently preferred, means for these programs to determine which process control program is currently active and responding to requests for process related data.

As has been stated the process control program that performs data acquisition and control functions operates in one of two modes, active and backup. In the active mode of operation, the program periodically performs instructions that gather input data from the I/O units 18, saves this information in memory, calculates outputs employing appropriate process control algorithms, and transmits these outputs to appropriate ones of the I/O units 18. The program also detects messages coming from other programs, such as requests for process status received over LAN 20 from the backup data processor, and transmits messages to requesting programs related to stored data about the process or processes being controlled.

Figure 6:
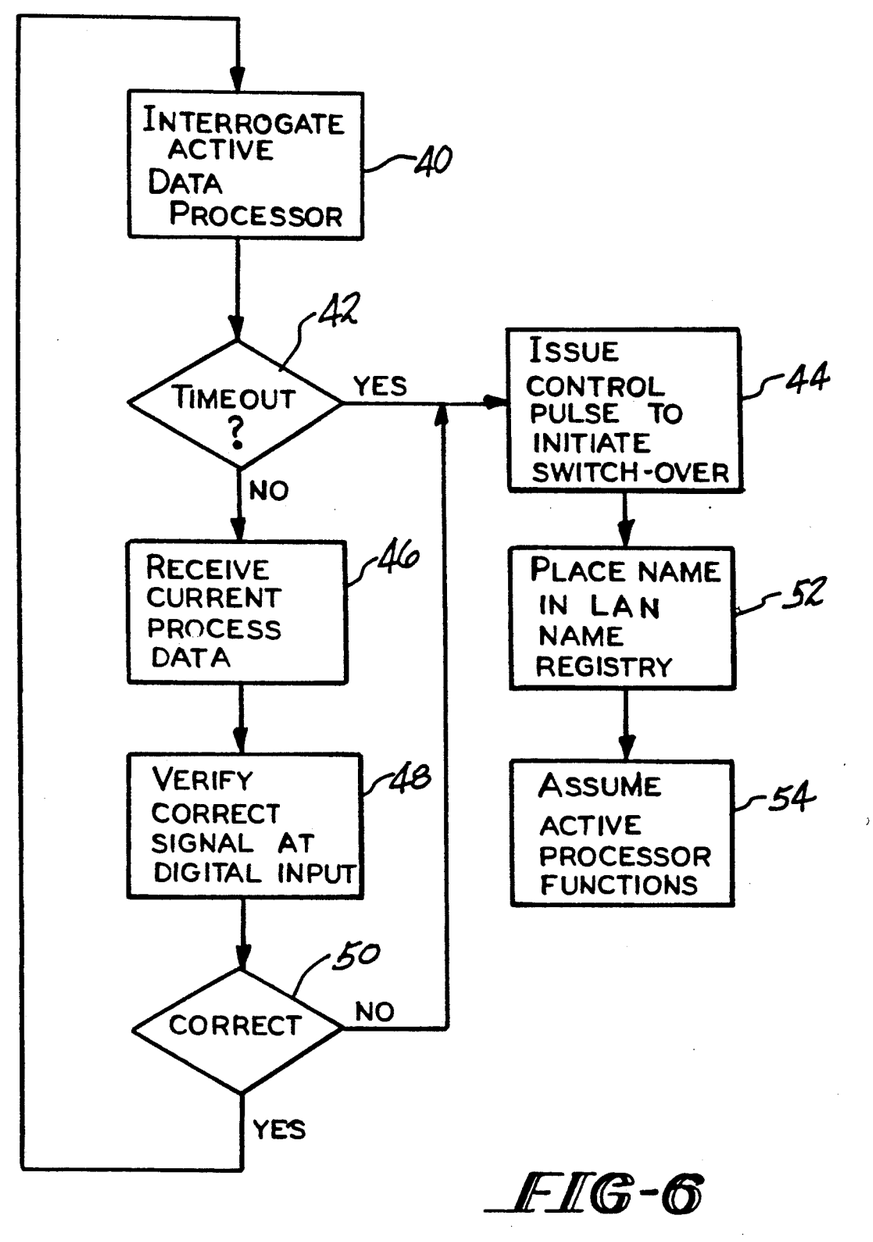
FIG. 6 is a flow chart that illustrates the operation of the process control system of the invention.

As can be seen in FIG. 6 in the backup mode of operation the process control program sends messages, via LAN 20, to the process control program running in active mode for the purpose of obtaining the current values of all process control data and configuration information (block 40). If the active process control program fails to respond to the messages sent by the backup process control program and/or the WDT 60 has signalled a loss of bus activity (block 42) the backup program automatically activates itself to assume the active role (block 44). The activation procedure includes a sequence that transmits a control pulse of predetermined width on a line of the associated bus 12a or 14a. This control pulse causes the switch 16 to allow access of the backup (now active) data processor to the I/O units 18 while simultaneously isolating the active (now backup) data processor from the I/O units 18. The activation procedure also includes replacing the name of the active processor in the LAN 20 name registry (block 52) and the assumption of the active processor functions of process control and monitoring (block 54). If a timeout does not occur at block 42 the backup processor receives and stores within memory 13 the current process related data (block 46) such that in the event the backup processor is required to assume the active processor functions the backup processor is fully cognizant of the current state of the process control environment. For the embodiment of FIG. 1 control at this point passes back to block 40. For the embodiment of FIG. 2 control passes to block 48 where the digital signal is read and verified from the DI logic block 24 or 26. If the digital signal is verified as correct control returns to block 40. If the signal is found to be in error or not present control passes to block 44 where the backup processor assumes the active processor function.

As can be appreciated from the foregoing discussion an important element of the system 10 is the electronic bus switch 16. Switch 16 operates in one of two modes, mode A and mode B. In mode A, the switch 16 directs all input/output communication from the I/O units 18 to DPA 12 while isolating all process bus 16a data and address lines from DPB 14. In mode B the switch 16 directs all input/output communication from the I/O units 18 to DPB 14 while isolating all process bus 16a data and address lines from DPA 12. The switch 16 operating mode is selected by the data processor seeking to take control of the process. If the switch 16 is in mode A (DPA 12 active) and receives a valid switch control pulse from DPB 14 (backup), switch 16 switches to mode B wherein DPB 14 assumes active control of the process bus 16a and DPA 12 assumes the backup mode of operation.

Figure 3:
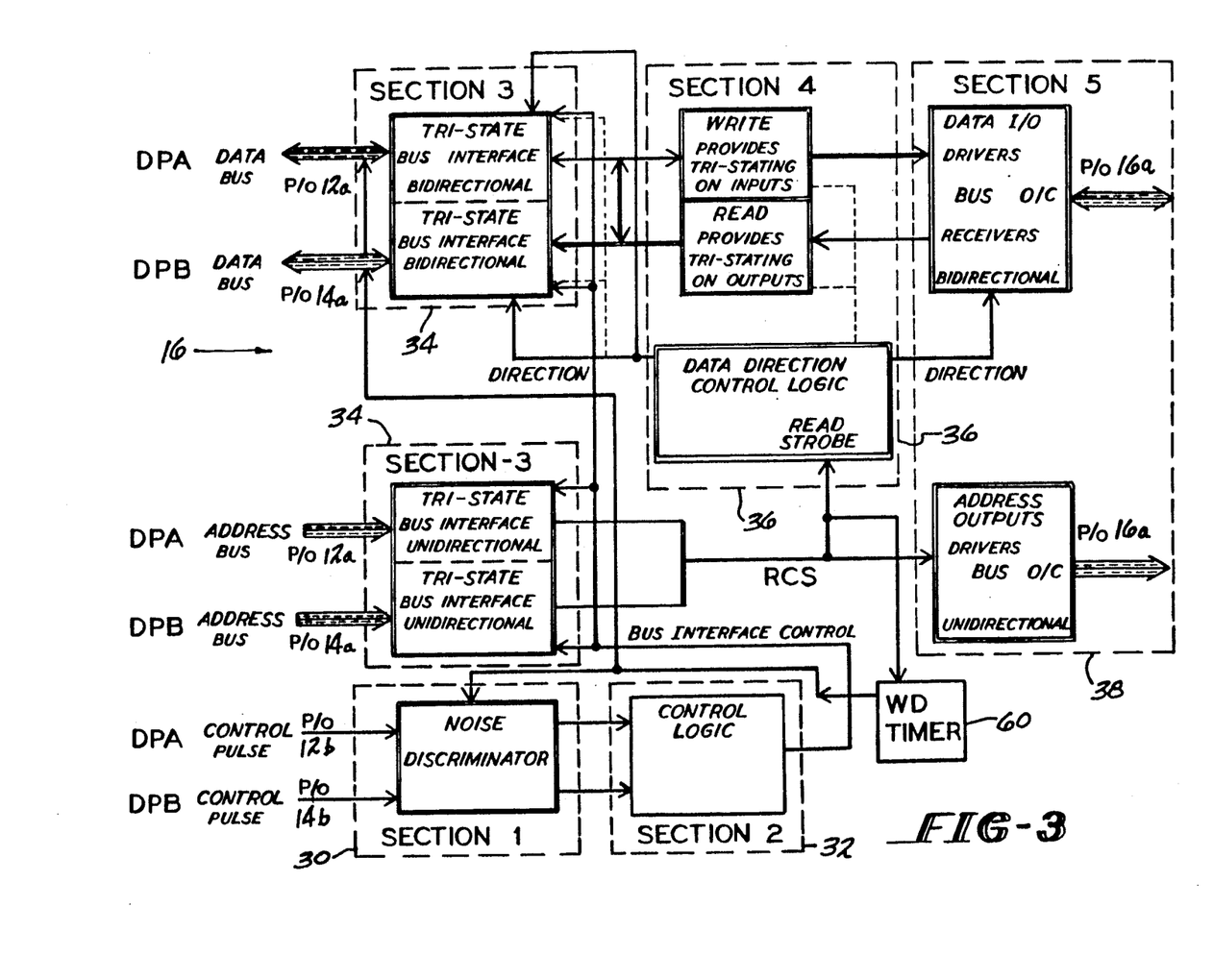
FIG. 3 is a block diagram of a first embodiment of an electronic bus switch.

The switch 16 is functionally represented by six sections as shown in FIG. 3.

Figure 3A:
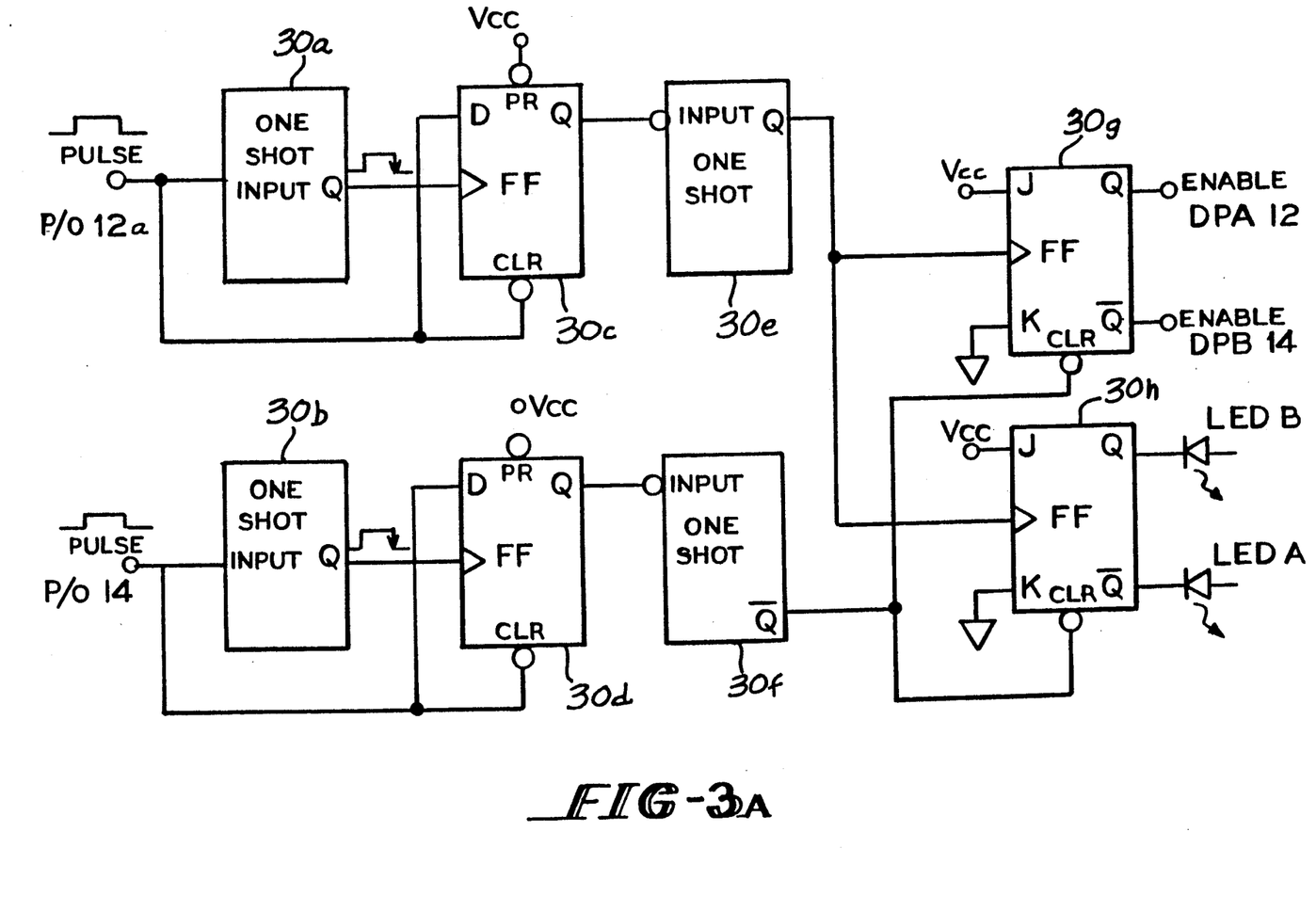
FIG. 3A shows in greater detail a Noise Discriminator block of FIG. 3.

Section one is comprised of a noise discriminator circuit 30 which is shown in greater detail in FIG. 3A. This circuit checks the validity of a switch control pulse before causing a switching control logic 32 circuit to switch modes from DPA 12 to DPB 14 or vice versa. A control pulse from either DPA 12 or DPB 14 is input into circuit 30 where the pulse width is tested. Specifically, the control pulse from bus 12a and bus 14a is input to an associated one shot multivibrator (OS) 30a and 30b, respectively. The rising edge of the pulse causes the OS to fire. Each pulse is also applied to a D input and to a CLEAR input of an associated flip/flop (FF) 30c and 30d, respectively. Assertion of the pulse on bus 12a removes a normally reset condition from the associated FF 30c or 30d. By example, OS 30a has a pulse width of a Q output that is set to be longer than a minimum acceptable pulse width of the input pulse on bus 12a. In a presently preferred embodiment of the invention the input pulse width is approximately six milliseconds. A falling edge of the Q output pulse from OS 30a sets FF 30c only if the pulse from bus 12a is still present. If instead the pulse on bus 12a were due to a noise spike the spike would be gone and FF 30c once more in a reset condition (CLR low) when the Q output of OS 30a times out and transitions from high to low. As a result FF 30c does not set and the noise pulse is ignored. Assuming that FF 30c is set (Q output is high) at some later time the pulse on bus 12a is removed by DPA 12. The removal of the pulse is required to cause FF 30c to reset. This ensures that if the associated data processor were to fail with its control pulse output in a logic high condition that a switchover to the failed processor would not inadvertently occur. The high to low transition at the input of OS 30e causes a positive going pulse on its Q output, thereby setting FFs 30g and 30h. The CLR inputs of FFs 30g and 30h are normally high (not reset) due to the Q-not output of OS 30f. Setting FF 30g causes an ENABLE DPA 12 signal to be asserted to other logic within the switch 16, thereby enabling only those data transceivers associated with DPA 12. A visual indication of this condition is provided by the energizing of LEDA. If a valid pulse were applied from bus 14a the Q-not output of OS 30f is pulsed low and causes FF 30g and FF 30h to reset, thereby asserting instead an ENABLE DPB 14 signal and energizing LEDB.

As can be seen from the above description two conditions must be met before a received pulse is considered valid.

A first condition requires that the pulse width of the control pulse be greater than a predetermined value. In a presently preferred embodiment the predetermined value is set by timing components of the OSs 30a and 30b. Pulses having a pulsewidth below the predetermined value are digitally filtered out to prevent high frequency or short duration spike noise from inadvertently initiating a change in mode, as could occur during a power interruption to one of the data processors.

A second condition requires that both a positive and a negative pulse voltage transition occur. This indicates a "normally-shaped" pulse that transitions from a logic zero to a logic high and back to a logic zero. Testing this condition prevents control from being given to a data processor that has failed with its control pulse line locked in a logic high condition. The noise discriminator circuit 30 generates a pulsed output to the switching control logic 32 only if a valid control pulse is received.

Section two contains the switching control logic 32 and provides the logic necessary to perform the bus 16a switching function. The signal from the noise discrimination circuit 30 causes specific logic states to be output from control logic 32 to the bus 12a and 14a interface logic 34, the logic states identifying the data processor that generated the valid control pulse. These logic states are specifically defined to enable those bus transceivers coupled to the data processor that generated the command pulse and to disable those bus transceivers coupled to the other data processor.

Section three provides bidirectional and/or unidirectional interface logic 34 to the data and address buses 12a and 14a. Interface logic 34 includes bidirectional tristate (high off-impedance) data bus transceivers, such as 74AS645-type devices, and address drivers such as 74AS640-type devices both of which are available from Texas Instruments of Dallas, Texas. Each of the data processors has a corresponding set of bus interface devices. The bus interface devices corresponding to the currently active data processor are enabled while bus interface devices associated with the backup data processor are disabled.

Section four implements data direction control logic 36. The logical implementation of this section is a function of specific application requirements and depends in part upon the specific read/write control signals available on the bus 16a and the directional characteristics of the data and address buses thereon. These factors are generally decided by the nature of the I/O units 18 selected. In a presently preferred embodiment the logic level of a Read Control Strobe (RCS) is used to determine the direction of data flow through the switch 16. The digital outputs of Section four are coupled to directional control lines on the bus transceivers and line receiver/drivers for controlling the direction of data flow therethrough. In addition, Section four interfaces between non-tristate (non-high impedance) line receiver/drivers, such as the open collector (OC) devices of the bus 16a, to the tristate-type transceivers of the interface logic 34 of Section three. The interface circuitry of Section four provides a means of combining a receiver signal with a driver signal from Section 5 on a common bus line by passing the lines through tristate-type buffers prior to combining them. These interfacing requirements are determined by the data acquisition equipment selected and upon a requirement to mix tristate and non-tristate integrated circuit types. In many cases, and as will be shown in FIGS. 4 and 5, the interface circuitry of Section four is not required if these two types of logic devices are not mixed.

Section five provides bidirectional and/or unidirectional interfaces 38 to the data and address buses of the bus 16a coupled to the I/O units 18. This section includes bidirectional bus transceivers connected to terminated data and address buses of the bus 16a. These transceivers are always enabled. The signal direction requirements are supplied to direction control lines of these transceivers by circuits described in Section four. The choice of transceiver type depends primarily upon the data acquisition equipment employed. Factors such as bus capacitance, bus impedance, and bus length are considerations. In the presently preferred embodiment high input impedance, high input threshold and high current driver outputs are provided to meet the electrical requirements imposed by a 500 foot parallel bus (bus 16a). One suitable type of driver device for this application is known as a 75138 and is also available from Texas Instruments. Proper impedance matching is achieved by termination of the bus lines 16a.

Section six illustrates the WDT 60. WTD 60 may be comprised of a re-triggerable one shot device having an input coupled to a bus line known to normally be active and R-C timing components having values selected to provide a time-out greater than a largest anticipated interval between input signals. In a preferred embodiment the input to the WDT 60 is the RCS although other suitable bus signal lines could be selected for this function. Periodic activity of the RCS, the normal condition, prevents the WDT 60 from "timing-out" and asserting a time-out signal on the buses 12a and 14a. This time-out signal is read by the backup data processor as previously described, causing the backup data processor to initiate a transfer of control or causing the transfer to be initiated in conjunction with the active data processor failing to respond to a request for update over the LAN 20. In another embodiment of the invention a pulse output of the WDT 60 is coupled to the noise discriminator circuit 30 to directly initiate a switchover from the active to the backup data processor. The WDT 60 pulse output is provided with the proper pulse width for recognition as a valid pulse by the noise discriminator circuit 30.

Figure 4:
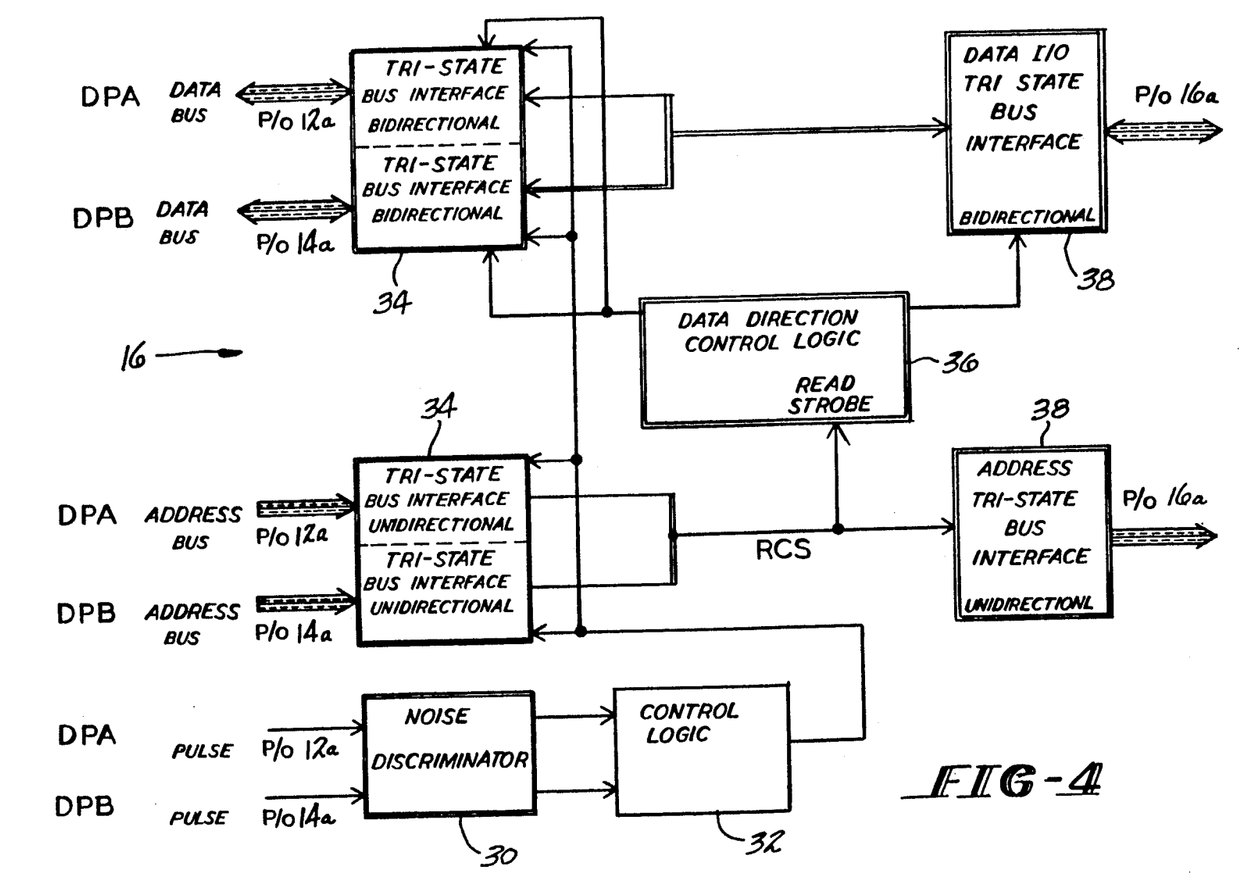
FIG. 4 is a block diagram of a second embodiment of an electronic bus switch.
Figure 5:
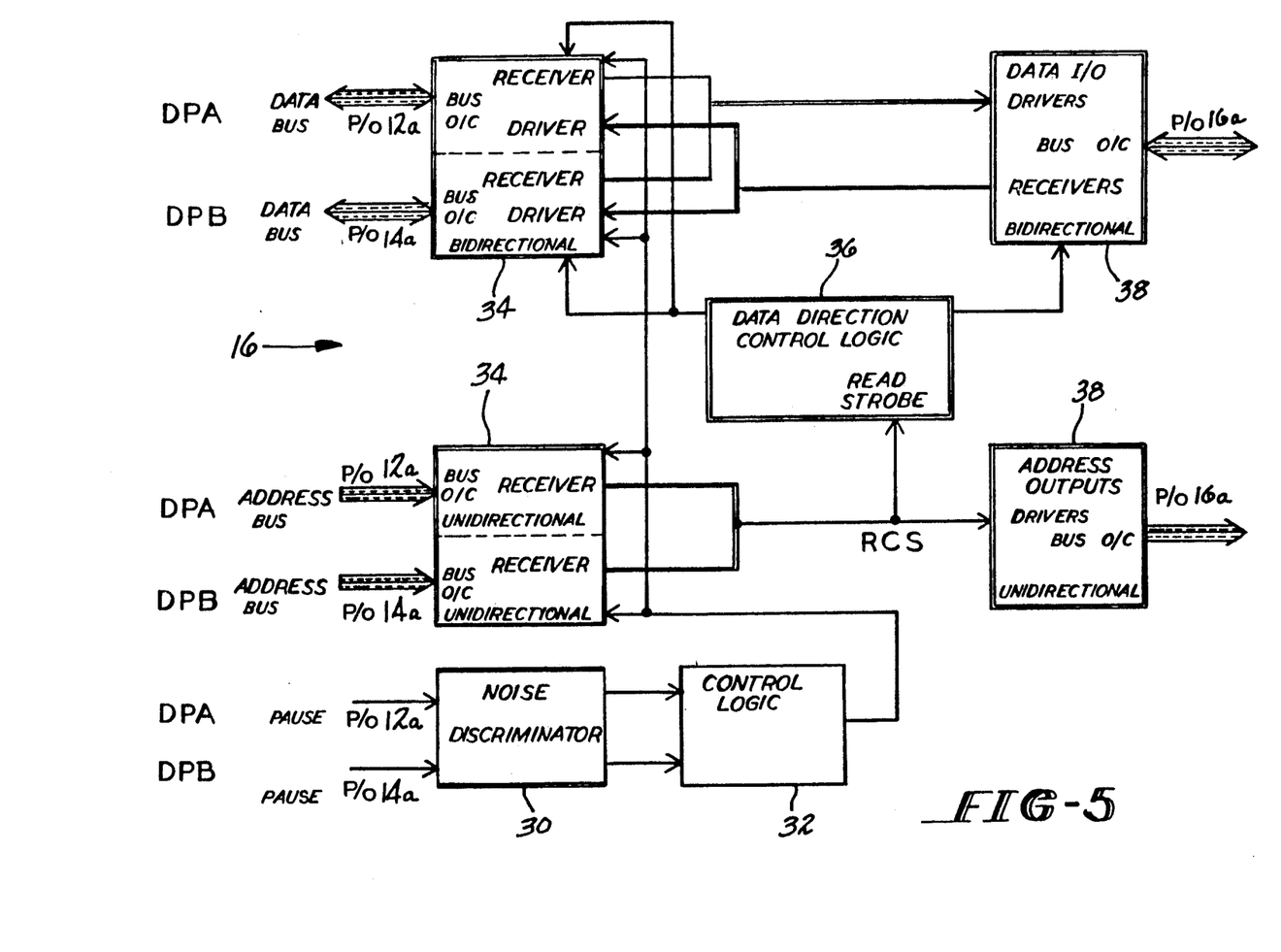
FIG. 5 is a block diagram of a third embodiment of an electronic bus switch.

FIGS. 4 and 5 each show an alternative configuration of the switch 16 that allows for the elimination of the interface circuitry of Section four between tristate and open collector type devices. In FIGS. 4 and 5 the WDT 60 is not illustrated, it being understood that the WDT 60 could be provided as shown in FIG. 3.

FIG. 4 shows an embodiment employing only tristate as opposed to open collector transceivers. FIG. 5 shows an embodiment employing only open collector as opposed to tristate transceivers. It is noted that open collector-type devices are generally preferred for driving the bus 16a in that these types of devices are generally better qualified than tristate devices for driving high capacitance, long length signal lines.

While the invention has been particularly shown and described with respect to presently preferred embodiments thereof, it will be understood by those skilled in the art that changes in form and details may be made therein without departing from the scope and spirit of the invention. By example, the functionality shown in FIG. 3A could be achieved with a single chip microcontroller having firmware for detecting and testing the control pulse inputs and also the output of the WDT 60 for generating output logic states indicative of the currently active data processor. As a further example, certain steps shown in FIG. 6 could be reordered without significantly changing the operation of the system. As such, the invention is intended to be limited only as the invention is set forth in the Claims that follow.

What is claimed is:

1. In a system having a plurality of data processors for controlling a resource, a method of controlling the resource comprising the steps of:
   a. communicating with the resource only from a first one of the data processors, the step of communicating including a step of transmitting data and receiving data through an active channel of a switch means, the switch means being coupled through a first communication path to the resource;
   b. periodically monitoring at the same time as the step of communicating with a second one of the data processors an activity of the first one of the data processors to determine if the first one of the data processors has stopped communicating with the resource, the step of monitoring occurring through a local area network second communication path coupled at least between the first one of the data processors and the second one of the data processors, the second one of the data processors being isolated from the resource; and
   c. if the step of monitoring indicates that the first one of the data processors has stopped communicating with the resource because of a detected control fault the method includes the further steps of
      i. independently having the second one of the data processors activate itself via a signal to the switch means such that the second one of the data processors is coupled to the active channel instead of the first one of the data processors; and
      ii. communicating with the resource only from the second one of the data processors, the step of communicating including a step of transmitting data and receiving data via the active channel of the switch means through the first communication path.

2. A method as set forth in claim 1 wherein the step of periodically monitoring includes a step of interrogating the first one of the data processors to determine a state of the resource and further includes a step of receiving a response from the first one of the data processors.

3. A method as set forth in claim 2 wherein the steps of periodically interrogating and receiving a response each include a step of communicating directly through the local area network second communication path.

4. A method as set forth in claim 2 wherein the step of receiving a response includes a step of storing in a memory means of the second one of the data processors the received response.

5. A method as set forth in claim 2 wherein the resource includes means for generating a digital signal having an output coupled to both the first one of the data processors and to the second one of the data processors and wherein the step of monitoring includes the additional steps of:
   periodically commanding the generating means to generate the digital signal, the step of periodically commanding including a step of transmitting a command to the generating means from the first one of the data processors through the first communication path;
   generating the digital signal; and
   reading the digital signal with the second one of the data processors to verify that the digital signal has been generated.

6. A method as set forth in claim 1 wherein the step of monitoring with a second one of the data processors includes an additional step of monitoring activity of the active channel to determine if the first one of the data processors has stopped communicating with the resource.

7. A method as set forth in claim 1 wherein the step of switching includes the steps of:
   signalling the data switch means from the second one of the data, processors by generating a pulse having a pulsewidth of predetermined duration to switch the second one of the data processors to the active channel of the switch means to receive data and transmit data, the data being received from the resource while isolating the first one of the processor units from the active channel of the switch means.

8. A method as set forth in claim 7 wherein the step of switching includes an initial step of verifying with the digital switch means that the generated pulse has a pulsewidth of predetermined duration.

9. Process control apparatus having at least two data processors for controlling at least one process controlling means, at any given time one of the data processors functioning in an active mode for controlling the process controlling means and the other one of the data processors functioning in a backup mode for assuming, if required, the function of the active data processor, the apparatus comprising:

a. means for communicating via only a first communication path with the process controlling means, said communicating means comprising a first digital bus coupled from the process controlling means to a first port of a digital switching means, a second digital bus coupled between the active data processor and a second port of the digital switching means, and a third digital bus coupled between a third port of the digital switching means and the backup data processor, the digital switching means comprising means for coupling at any given time either the second one of the digital buses or the third one of the digital buses to the first digital bus;

b. means for periodically monitoring with the backup data processor an activity of the active data processor at the same time that the active data processor communicates with the process controlling means to determine if the active data processor has failed, the monitoring means comprising a local area network second communication path directly coupled between the active data processor and the backup data processor, the backup data processor being isolated from the process controlling means; and c. the digital switch means further comprising means having an input coupled to the backup data processor and responsive to an electrical pulse having a pulsewidth of predetermined duration that is generated independently by the backup data processor in response to a monitored condition by the monitoring means of a control fault between the active data processor and the process controlling means for switching the first digital bus from the active data processor to the backup data processor such that the backup data processor can assume the function of the active data processor.

10. Process control apparatus as set forth in claim 9 wherein the local area network second communication path includes name registry means and wherein an identity of the active data processor is stored within the name registry means.

11. Process control apparatus as set forth in claim 9 and further comprising watch dog timer means coupled to both the second digital bus and to the third digital bus for monitoring bus activity at least on the digital bus associated with the active data processor.

12. Process control apparatus as set forth in claim 11 wherein the watch dog timer means includes output means coupled to an input of the backup data processor for notifying the backup data processor of a cessation of bus activity on the digital bus associated with the active data processor.

13. Process control apparatus as set forth in claim 11 wherein the watch dog timer means includes output means coupled to an input of the switching means for initiating the switching of the first digital bus to the backup data processor upon a cessation of bus activity on the digital bus associated with the active data processor.

14. Process control apparatus as set forth in claim 9 and further comprising means for generating a digital signal, said digital signal generating means having an output coupled at least to the backup data processor and an input coupled to the active data processor through the first digital bus such that the active data processor is enabled to periodically command the digital signal generating means to generate a digital signal, the backup data processor including means for reading the digital signal to verify that the digital signal has been generated.

15. Digital switching apparatus comprising a first port for coupling to a first bus, a second port for coupling to a second bus, and a third port for coupling to a third bus, the digital switching apparatus further comprising means for coupling /at any given time either the second bus or the third bus to the first bus, the digital switching apparatus further comprising pulse detection means having a first input means and a second input means each for coupling to an electrical pulse, the pulse detection means comprising means for determining if a pulsewidth of a detected pulse is within a predetermined pulsewidth range and further comprising means for determining if a received pulse transitions from a first logic state to a second logic state and back to the first logic state, the pulse detection means having an output means coupled to the coupling means for causing the coupling means to couple the second bus to the first bus when a pulse generated by a first active data processor is detected on the first input means and for causing the coupling means to couple the third bus to the first bus when a pulse generated independently by a second backup data processor in response to a detected control fault in the first active data processor is detected on the second input means, the second backup data processor being isolated from process controlling means communicating with the first active data processor.

16. Digital switching apparatus as set forth in claim 15 wherein the first port, the second port and the third port are comprised of logic devices one selected from the group consisting of open collector outputs, high impedance outputs and combinations thereof.

17. Digital switching apparatus as set forth in claim 15 and further comprising means for monitoring activity of at least one signal line associated with the second bus and the third bus, the monitoring means further having an output for indicating an occurrence of a cessation of activity of the at least one signal line.

18. Digital switching apparatus as set forth in claim 17 wherein said monitoring means output is coupled to means for generating the detected pulse to cause said pulse to be generated.

19. Digital switching apparatus as set forth in claim 17 wherein said monitoring means output is coupled to the pulse detection means for causing the pulse detection means to generate an output indicating an occurrence of a cessation of activity of the at least one signal line.

* * * * *

UNITED STATES PATENT AND TRADEMARK OFFICE
CERTIFICATE OF CORRECTION

PATENT NO. : 5,185,693
DATED : February 9, 1993
INVENTOR(S) : Donald B. Loftis, et al It is certified that error appears in the above-indentified patent and that said Letters Patent is hereby corrected as shown below:

In column 12, line 25 after "coupling" delete "/"

In column 12, line 33 after "a" and before "pulse" delete "received" and insert --detected-- in its place.

Signed and Sealed this

Twenty-third Day of November, 1993

Attest:

BRUCE LEHMAN

*Attesting Officer*  *Commissioner of Patents and Trademarks*